United States Patent
Gale et al.

(10) Patent No.: US 8,638,692 B2
(45) Date of Patent: Jan. 28, 2014

(54) SYSTEM AND METHOD FOR END-TO-END AUTOMATIC CONFIGURATION OF NETWORK ELEMENTS USING A LINK-LEVEL PROTOCOL

(75) Inventors: Benjamin Gale, Raleigh, NC (US); John McLendon, Raleigh, NC (US)

(73) Assignee: Broadcom Corporation, Irvine, CA (US)

( * ) Notice: Subject to any disclaimer, the term of this patent is extended or adjusted under 35 U.S.C. 154(b) by 234 days.

(21) Appl. No.: 13/301,954

(22) Filed: Nov. 22, 2011

(65) Prior Publication Data

US 2013/0100809 A1 Apr. 25, 2013

Related U.S. Application Data

(60) Provisional application No. 61/548,898, filed on Oct. 19, 2011.

(51) Int. Cl.
*H04L 12/28* (2006.01)

(52) U.S. Cl.
USPC ........... 370/254; 370/235; 370/255; 370/257; 370/238; 370/217; 709/227; 709/221; 709/226; 709/223

(58) Field of Classification Search
USPC ......... 370/235, 254, 255, 238, 217, 250, 257; 709/227, 221, 226, 223
See application file for complete search history.

(56) References Cited

U.S. PATENT DOCUMENTS

| | | | |
|---|---|---|---|
| 7,380,025 B1 * | 5/2008 | Riggins et al. | 710/8 |
| 7,411,915 B1 * | 8/2008 | Spain et al. | 370/250 |
| 7,441,021 B1 * | 10/2008 | Perry | 709/223 |
| 7,508,775 B2 * | 3/2009 | Ackermann-Markes et al. | 370/257 |
| 7,606,920 B2 * | 10/2009 | Van Datta et al. | 709/230 |
| 7,864,704 B2 * | 1/2011 | Lee et al. | 370/254 |
| 7,957,394 B1 * | 6/2011 | Cohen et al. | 370/395.21 |
| 8,085,808 B2 * | 12/2011 | Brusca et al. | 370/466 |
| 8,385,353 B2 * | 2/2013 | Salam et al. | 370/395.53 |
| 2005/0270989 A1 * | 12/2005 | Park et al. | 370/254 |
| 2011/0082921 A1 * | 4/2011 | Breslin et al. | 709/221 |

* cited by examiner

*Primary Examiner* — Rasheed Gidado
(74) *Attorney, Agent, or Firm* — Duane S. Kobayashi

(57) ABSTRACT

A system and method for end-to-end automatic configuration of network elements using a link-level protocol. Network elements can be auto-configured through the propagation of configuration information. Configuration information is propagated using ports that have defined port roles that enable automatic propagation of configuration information.

17 Claims, 3 Drawing Sheets

SYSTEM AND METHOD FOR END-TO-END AUTOMATIC CONFIGURATION OF NETWORK ELEMENTS USING A LINK-LEVEL PROTOCOL

This application claims priority to provisional patent application No. 61/548,898, filed Oct. 19, 2011, which is incorporated by reference herein, in its entirety, for all purposes.

BACKGROUND

1. Field of the Invention

The present invention relates generally to network systems and, more particularly, to a system and method for end-to-end automatic configuration of network elements using a link level protocol.

2. Introduction

Manual configuration of an enterprise network can be a time-consuming, labor-intensive process. Historically, most configuration tasks have been handled via manual processes. In today's modern enterprise networks, this manual configuration is no longer viable due to the scale and complexity of today's infrastructure.

Configuration management, which can include a collection of processes and tools that promote network consistency and track network changes, is a key element in improving network availability and lowering costs. For example, best practices in configuration management will lead to lower support costs due to a decrease in reactionary support measures taken by IT administrators. The same would also hold true in the corresponding improvement in network availability due to decreased instances of network elements taken offline for diagnostic and configuration support.

To decrease the number of problems that can arise from a manual configuration process, one option is to rely on a centralized protocol. A disadvantage of such a centralized protocol, however, is the large amounts of communication required between network elements and the centralized control in maintaining an accurate view of the configured state of the monitored network elements. What is needed therefore is an efficient mechanism for end-to-end configuration of network elements.

SUMMARY

A system and/or method for end-to-end automatic configuration of network elements using a link-level protocol, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
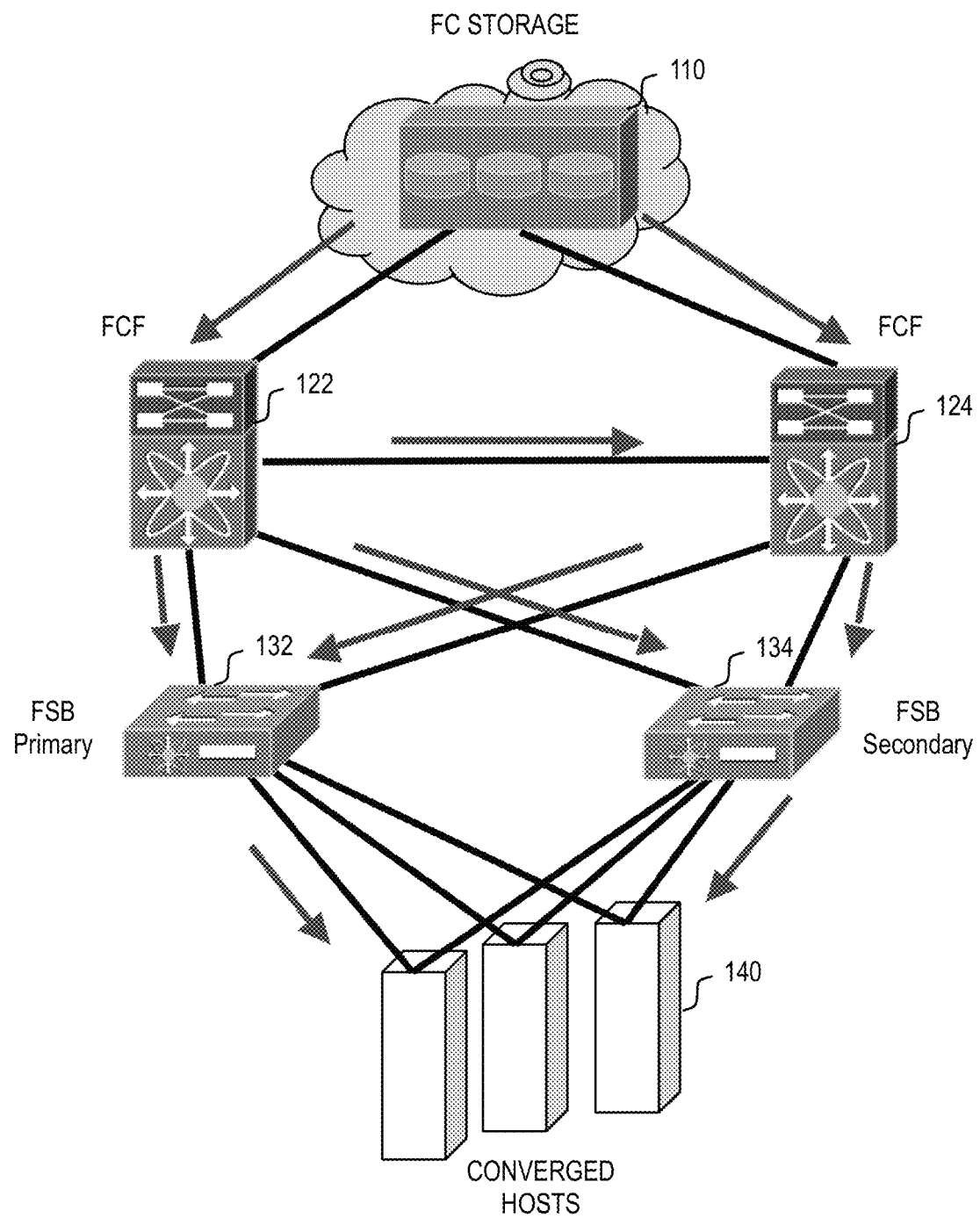
FIG. 1 illustrates an example network topology.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In the present invention, a mechanism is provided that can auto-configure switches and hosts based on configuration information that is propagated over the network using a link-level protocol. It is a feature of the present invention that this propagation of configuration information using the link-level protocol enables end-to-end auto-configuration of network elements. This end-to-end auto-configuration enables the network to adapt to changes in network configuration and to propagate such changes to other switches and hosts in the network.

In one embodiment, the principles of the present invention can be effected using the Data Center Bridging Exchange Protocol (DCBX), which can be used by Data Center Bridging (DCB) devices to exchange configuration information with directly-connected peers. In general, DCB is a set of IEEE 802.1Q extensions to standard Ethernet, that provide an operational framework for unifying local area networks (LAN), storage area networks (SAN) and inter-process communication (IPC) traffic between switches and endpoints onto a single transport layer. For an end-to-end DCB network to be properly configured there are various components that can be used to administrate the networks, including priority-based flow control (PFC), enhanced transmission selection (ETS), and application priorities.

PFC allows flow control on a per-priority basis. For example, certain traffic types (e.g., storage traffic) can require lossless data transport, while other traffic types (e.g., LAN traffic) can work in a best effort transport with end station protocols such as TCP detecting and reacting to dropped packets. For the traffic types that require a lossless data transport, if an ingress port detects buffer congestion, the ingress port may need to signal to the other end of the link to stop transmitting data. In Ethernet networks, this can be accomplished using PAUSE frames as specified in 802.3x. Significantly, however, 802.3x is not optimal in a converged DCB environment because it stops all traffic on the port if there is buffer congestion for any traffic type. PFC can solve this problem by allowing traffic associated with certain priorities to be paused while traffic associated with other priorities on the same port can continue to flow.

ETS allows priority-based processing and bandwidth allocation on different traffic classes with different traffic types (e.g., LAN, SAN, IPC). For example, LAN traffic can be forgiving of losses, SAN traffic (e.g., FCoE, iSCSI) should be lossless and IPC traffic should be low-latency. All of these types of traffic should coexist on a single link without imposing serious restrictions on each other's performance. Supporting these different traffic classes on the same link may require the capability to allocate a guaranteed percentage of the total bandwidth to each traffic class and to handle large, burst transfers of a traffic class.

In accordance with the present invention, DCBX can be used to exchange configuration information and can be used to detect misconfiguration, configure auto-downstream peers, and receive configuration from auto-upstream peers. In most systems, the DCBX component provides a configuration transport service to other application components in the system. Such application components are referred to as DCBX clients.

To illustrate an application of the principles of the present invention, reference is made to FIG. 1, which illustrates an example network topology. This example illustrates a redundant Fiber Channel over Ethernet (FCoE) topology that has redundant FCoE Initialization Protocol (FIP) snooping bridges (FSBs) 132, 134 that are coupled to FC storage 110 via a pair of Fiber Channel Forwarders (FCFs) 122, 124.

As illustrated in the example topology, the possible paths for automatic propagation of configuration information is shown with large arrows indicating the flow of configuration information. Propagation of the configuration information is dependant on the peer being DCBX enabled and each peer having compatible capabilities.

In this framework, DCBX can be used to propagate configuration information from the core of the network (e.g., FCFs or FCoE Data Forwarders (FDFs)) to other DCBX-enabled network elements. As such, DCBX can be used in an end-to-end automatic configuration framework to accept information from auto-upstream ports (e.g., those ports connected to FCFs or FDFs), deliver it to the PFC/ETS applications, and propagate PFC/ETS information to directly attached converged network adapters (CNAs). CNAs that cannot accept the propagated configuration due to significant configuration mismatches can be disabled by the applications.

As would be appreciated, the operator can manually configure each network element, ensuring that the configurations are compatible across the network. This manual process is time consuming and can lead to misconfigurations. Such being the case, DCBX can be used as a validation mechanism for manual ETS/PFC configuration. The ETS/PFC compatibility checking can be used to notify the network operator and DCBX clients, such as an FCoE component, of any misconfigurations such that the DCBX client would refuse to operate until the network misconfiguration is corrected.

As noted above, the principles of the present invention enable the DCBX protocol to provide the capability for a network element to change or confirm its application configuration based on a peer device configuration as well as propagate its configuration to peer devices. When a network element is enabled to exchange configuration with its peer, the network element advertises its configuration to the peer. The peer device can choose to accept the configuration advertised by the network element or it could choose to use its own configuration based on default or operator configuration. Additionally, the network element can accept the peer's configuration as its own and subsequently propagate the configuration to other peers. The exchanged configuration values of interest and the propagation through the network element of received configuration values is determined by the DCBX clients.

In accordance with the present invention, the propagation of configuration information through the network as part of an end-to-end automatic configuration process is facilitated by defined port roles. In general, each port's behavior is dependent on the operational mode of that port and of other ports in the stack. The port role is a DCBX configuration item that can be passed to the DCBX clients to control the processing of their configuration information. In one embodiment, four port roles can be defined, including manual, auto-upstream, auto-downstream and configuration source.

Ports operating in the manual role do not have their configuration affected by peer devices or by internal propagation of configuration. As such, these manual ports can have their configuration (e.g., operational mode, topology change, bandwidth information, etc.) specified explicitly by an operator. A port that is set to a manual role would set the willing bit for DCBX client TLVs to false. Ports operating in the manual role would not be configured to internally propagate configuration information or accept internal or external configuration information from other ports. Manual ports can advertise their configuration to their peer if DCBX is enabled on that port. Such advertisement would enable incompatible peer configurations to be logged.

Ports operating in the auto-upstream role would advertise a configuration. Auto-upstream ports would also be willing to accept a configuration from the link-partner and propagate that configuration internally to auto-downstream ports. Here, the willing parameter is enabled on the port and the recommendation TLV is sent to the peer and processed if received locally. As described below, an auto-upstream port can also receive a configuration that is propagated internally by other auto-upstream ports.

The first auto-upstream port to successfully accept a configuration, which the port is capable of utilizing, becomes the configuration source. The configuration source propagates its configuration to other auto-upstream and auto-downstream ports. Only the configuration source, however, may propagate configuration information to other ports internally. Auto-upstream ports that receive internally propagated information would ignore their local configuration and utilize the internally-propagated configuration information.

Peer configurations received on auto-upstream ports other than the configuration source can result in one of two possibilities. If the peer configuration is compatible with the configuration from the configuration source, then the DCBX client becomes operationally active on the auto-upstream port. If the configuration from the configuration source is not compatible with the DCBX peer, then a message is logged indicating an incompatible configuration, and the DCBX client is operationally disabled on the port.

Ports operating in the auto-downstream role would advertise a configuration but would not be willing to accept a configuration from the link partner. However, the auto-downstream port would always accept a configuration propagated internally by the configuration source. Here, the willing parameter is disabled on the auto-downstream port. By default, auto-downstream ports would have the recommendation TLV parameter enabled. Auto-downstream ports that receive internally propagated configuration information would ignore their local configuration and utilize the internally propagated information. Auto-downstream ports become operationally enabled when the peer returns a compatible configuration.

A port in the configuration source role can be manually selected to be the configuration source. Configuration received over this port is propagated to the other auto-configuration ports, however, no automatic election of a new configuration source port would be allowed and events that would cause selection of a new configuration source would be ignored. The configuration received over the configuration source port is maintained until cleared by the operator.

Where no active configuration source exists, a configuration source port selection process can be implemented. If there is no configuration source, a port may elect itself as the configuration source on a first-come, first-serve basis from the set of eligible ports. In one embodiment, a port is eligible to become the configuration source if no other port is the configuration source, the port role is auto-upstream, the port is enabled with link up and DCBX enabled, the port has negotiated a DCBX relationship with the partner, and the network element is capable of supporting the received configuration values, either directly or by translating the values into an equivalent configuration. It should be noted that in one embodiment, whether or not the peer configuration is compatible with the configured values need not be considered.

The newly-elected configuration source propagates DCBX client information to the other ports and is internally marked as being the port over which configuration has been received. Configuration changes received from the peer over the configuration source port are propagated to the other auto-configuration ports. Ports receiving auto-configuration information from the configuration source ignore their current settings and utilize the configuration source information. In one embodiment, the auto-configuration information would not overwrite the administrators port configuration.

When a configuration source is selected, all auto-upstream ports other than the configuration source are marked as willing disabled. In one embodiment, to reduce "flapping" of configuration information, if the configuration source port is disabled, disconnected or loses DCBX connectivity, the system can be designed to clear the selection of the configuration source port (if not manually selected) and enable the willing bit on all auto-upstream ports. The configuration on the auto-configuration ports is not cleared (configuration holdover). If the user wishes to clear the configuration on the system in this scenario, the user can put the configuration source port into manual mode.

When a new port is selected as the configuration source, it is marked as the configuration source, the DCBX configuration is refreshed on all auto-configuration ports, and each port can begin configuration negotiation with their peer again (if any information has changed).

It is a feature of the present invention that the definition of port roles enables the automatic propagation of configuration information through the network. More specifically, the definition of port roles can determine the particular directions of propagation of configuration information through a network.

Figure 2:
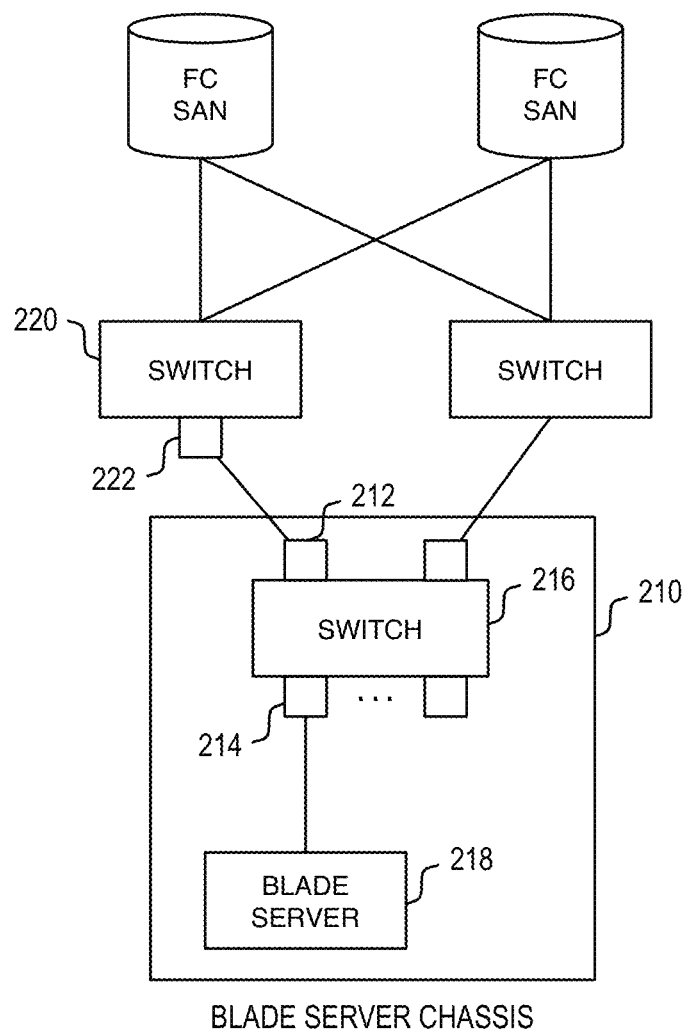
FIG. 2 illustrates an example configuration that illustrates propagation of configuration information.

To further illustrate the process of propagation of configuration information through a network, reference is now made to the example propagation scenario illustrated in FIG. 2. As illustrated in FIG. 2, DCBX can be deployed on blade server chassis 210 having external and internal ports. Here, the external 40G ports of blade server chassis 210 can be coupled to a pair of switches via a spanning tree protocol (STP) redundant topology, while the internal ports are connected to a 10G backplane that facilitates connection to a plurality of blade servers in blade server chassis 200. DCBX is used on blade server chassis 200 by client features that exchange link-level configuration through DCBX.

More specifically, blade server chassis 210 has external port 212 that is coupled to external port 222 of switch 220. External port 222 of switch 220 is configured as an auto-downstream port, while external port 212 is configured as an auto-upstream port. Blade server chassis 210 also has internal port 214 that is coupled to the 10G backplane that facilitates connection to blade server 218. In this arrangement, internal port 214 can be designated as an auto-downstream port. The definition of the port roles of external port 222, external port 212 and internal port 214 determines the direction of propagation of configuration information as described below in the example configuration process of blade server chassis 210.

When blade server chassis 210 is booted, LLDP/DCBX initializes on the auto-downstream and auto-upstream ports. The auto-upstream ports begin self-configuration. As part of this process, the spanning tree converges to a single active uplink between blade server chassis 210 and switch 220. As external port 222 of switch 220 is configured as an auto-downstream port, external port 222 is not willing to accept a configuration from external port 212 of blade server chassis 210. As external port 212 of blade server chassis 210 is configured as an auto-upstream port, external port 212 is willing to accept a configuration from external port 222 of switch 220.

Assume then that switch 216 in blade server chassis 210 receives configuration information from active switch 220 on an auto-upstream port 212. If local port 212 is the first auto-upstream port to have received such configuration information then auto-upstream port 212 becomes the configuration source port for blade server chassis 210. DCBX would then pass this configuration information to the client features as required, and informs them of the identity of the configuration source port.

Each client feature accepts the configuration information received on the configuration source port 212 and internally propagates the configuration information to all of its enabled auto-configuration ports (upstream and downstream). Since, all auto-configuration ports have a default state at this point, they would accept the propagated configuration information. The client features accept the received configuration and advertise it back out to the configuration source port using DCBX. Switch 220 would then complete DCBX auto-negotiation and becomes application operationally enabled. As would be appreciated, the client features could then use DCBX to propagate the configuration information out to all link partners on enabled auto-configuration ports.

Figure 3:
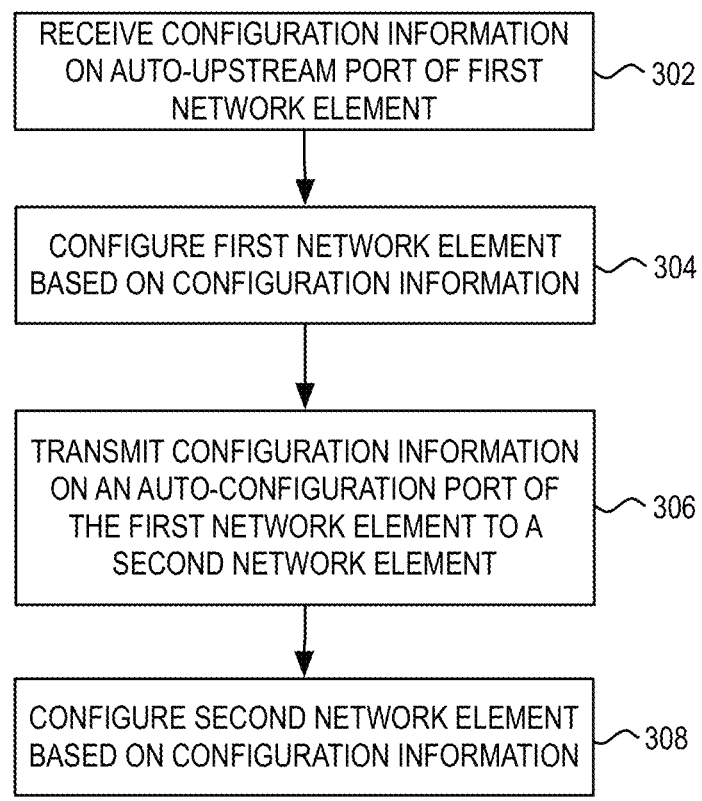
FIG. 3 illustrates flowchart of a process of the present invention.

To further illustrate the propagation feature of the present invention, reference is now made to the flowchart of FIG. 3. In general, the flowchart of FIG. 3 includes elements of a process that enables the propagation of configuration information through a network to effect end-to-end automatic configuration.

As illustrated, the process begins at step 302 where configuration information is received on a auto-upstream port of a first network element. The designation of an external port as an auto-upstream port defines a port role such that the auto-upstream port is configured to not only advertise a configuration to a link-partner, but also to accept a configuration from the link-partner. The receipt of configuration information on an auto-upstream port can result in the configuration of at least one port of the first network element in accordance with received configuration information at step 304. This assumes, of course, that the received configuration information identifies a compatible configuration supported by the first network element on that auto-upstream port.

In the present invention, the use of a link-level protocol to enable configuration on a port is not confined to the configuration of a single port. Rather, it is a feature of the present invention that the link-level protocol can be used to effect end-to-end configuration in a network through the propagation of configuration information over multiple ports that can span one or more network elements. This propagation of configuration information is exemplified at step 306 where the configuration information that was previously received on the auto-upstream port can be transmitted on another auto-configuration port of the first network element to a second network element. In one example, the auto-configuration port is an auto-downstream port. This propagated configuration information can then be used to configure functionality of the second network element on that port.

As has been described, auto-configuration ports enable the automatic configuration of network elements through the propagation of configuration information. This enables endto-end configuration using a link-level protocol where configuration information received on an auto-upstream port can be propagated to other ports.

It should also be noted that while the above description of the propagation of configuration information was in the context of DCBX, the principles of the present invention are not so limited. In general, the propagation of configuration information such as that described above can be carried out by other suitable link-level protocols.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A configuration method in a network element, comprising:
receiving, on a first port of said network element, first configuration information from a first peer device coupled to said first port, said first port having an assigned port role of auto-configuration upstream, wherein said assigned port role of auto-configuration upstream enables said network element to advertise a configuration to said first peer device and to accept a configuration advertised by said first peer device;
configuring said network element based on said received first configuration information; and
transmitting, on a second port of said network element, second configuration information to a second peer device coupled to said second port, said second configuration information being based on said first configuration information, said second port having an assigned port role of auto-configuration downstream, wherein said assigned port role of auto-configuration downstream enables said network element to advertise a configuration to said second peer device and to prevent a configuration advertised by said second peer device from being accepted by said network element.

2. The method of claim 1, wherein said first configuration information is priority based flow control configuration information or enhanced transmission selection configuration information.

3. The method of claim 1, further comprising transmitting, by said network element on said first port, a time-length-value frame having a willing bit set to an affirmative value, said affirmative value indicating to said first peer device that said network element is willing to accept a configuration from said first peer device.

4. The method of claim 1, further comprising transmitting, by said network element on said second port, a time-length-value frame having a willing bit set to a negative value, said negative value indicating to said second peer device that said network element is not willing to accept a configuration from said second peer device.

5. The method of claim 1, wherein said assigned port role of auto-configuration downstream for said second port dictates that said second port always accepts a configuration that is advertised internally by said network element from a port that has a port role of configuration source.

6. The method of claim 1, further comprising disabling said second port if a configuration received from said second peer device is not compatible.

7. A configuration method in a network element, comprising:
transmitting, on a first port of said network element, first configuration information to a peer device coupled to said first port, said first configuration information being received by said first port from a second port of said network element, said first port having an assigned port role of auto-configuration downstream, wherein said assigned port role of auto-configuration downstream enables said network element to advertise a configuration to said peer device and to prevent a configuration advertised by said peer device from being accepted by said network element;
receiving, on said first port of said network element, second configuration information from said peer device;
determining whether said received second configuration information is compatible with said first configuration information that was transmitted to said peer device; and
generating an error message for said first port of said network element if it is determined that said second configuration information is not compatible with said first configuration information.

8. The method of claim 7, further comprising enabling operation of said first port if it is determined that said second configuration information is compatible with said first configuration information.

9. The method of claim 7, wherein said first configuration information is priority based flow control configuration information or enhanced transmission selection configuration information.

10. The method of claim 7, further comprising transmitting, by said network element on said first port, a time-length-value frame having a willing bit set to a negative value, said negative value indicating to said peer device that said network element is not willing to accept a configuration from said peer device.

11. The method of claim 7, wherein said assigned port role of auto-configuration downstream for said first port dictates that said first port always accepts a configuration that is advertised internally by said network element from a port that has a port role of configuration source.

12. A configuration method in a network having a plurality of network elements, comprising:
establishing a first port in a first of said plurality of network elements as a configuration source; and
advertising a configuration from said first port to a plurality of internal ports of said first of said plurality of network elements, said plurality of internal ports including a second port having an assigned port role of auto-configuration upstream and a third port having an assigned port role of auto-configuration downstream; and
accepting, in said second and third port, said advertised configuration from said first port, wherein said assigned port role of auto-configuration upstream enables said first of said plurality of network elements to transmit said advertised configuration to a first peer device coupled to said second port and to accept a configuration advertised by said first peer device, and wherein said assigned port role of auto-configuration downstream enables said first of said plurality of network elements to transmit said advertised configuration to a second peer device coupled to said third port and to prevent a configuration advertised by said second peer device from being accepted by said first of said plurality of network elements.

13. The method of claim 12, wherein said establishing comprises establishing through manual selection.

14. The method of claim 12, wherein said establishing comprises establishing through an automatic selection process.

15. The method of claim 12, wherein said advertised configuration is based on priority based flow control configuration information or enhanced transmission selection configuration information.

16. The method of claim 12, further comprising transmitting on said second port to said first peer device a time-length-value frame having a willing bit set to an affirmative value, said affirmative value indicating to said first peer device that said first of said plurality of network elements is willing to accept a configuration from said first peer device.

17. The method of claim 12, further comprising transmitting on said third port to said second peer device a time-length-value frame having a willing bit set to a negative value, said negative value indicating to said second peer device that said first of said plurality of network elements is not willing to accept a configuration from said second peer device.

* * * * *